(12) United States Patent
Moore

(10) Patent No.: US 6,185,891 B1
(45) Date of Patent: Feb. 13, 2001

(54) HURRICANE RESISTANT FOAM-CONCRETE STRUCTURAL COMPOSITE

(75) Inventor: Paul K. Moore, Middleburg, FL (US)

(73) Assignee: R-40 Homes, Inc., Jupiter, FL (US)

(*) Notice: Under 35 U.S.C. 154(b), the term of this patent shall be extended for 0 days.

(21) Appl. No.: 09/349,024

(22) Filed: Jul. 7, 1999

(51) Int. Cl.⁷ .................................................... E04C 1/00
(52) U.S. Cl. ............................................................. 52/309.7
(58) Field of Search ............................ 52/309.12, 309.7, 52/309.16, 309.17, 781, 777, 778, 779, 780, 742.14

(56) References Cited

U.S. PATENT DOCUMENTS

| | | |
|---|---|---|
| 2,269,018 | 1/1942 | Guignon, Jr. . |
| 3,292,331 | 12/1966 | Sams . |
| 3,755,982 | 9/1973 | Schmidt . |
| 3,782,049 | 1/1974 | Sachs . |
| 4,229,497 * | 10/1980 | Piazza .......................... 52/309.12 X |
| 4,641,468 | 2/1987 | Slater . |
| 4,653,243 * | 3/1987 | Burkett ............................ 52/309.8 X |
| 4,674,242 * | 6/1987 | Oboler et al. .................... 52/309.7 X |
| 4,741,777 * | 5/1988 | Williams et al. ....................... 106/90 |
| 4,774,794 | 10/1988 | Grieb . |
| 5,123,222 | 6/1992 | Guarriello et al. . |
| 5,231,813 | 8/1993 | Drawdy . |
| 5,566,521 | 10/1996 | Andrews et al. . |
| 5,771,649 | 6/1998 | Zweig . |
| 5,921,046 * | 7/1999 | Hammond .............................. 52/564 |

FOREIGN PATENT DOCUMENTS 767681    7/1934    (FR) .

* cited by examiner

*Primary Examiner*—David M. Purol
(74) *Attorney, Agent, or Firm*—McHale & Slavin

(57) ABSTRACT

The present invention is directed toward a new method of building construction which eliminates traditional framed wall and trussed roof construction methods. The method of construction utilizes a polymer bonded foam-concrete structural composite building material formed from a styrene foam having a fiber reinforced, ethylene-vinyl acetate containing concrete emulsion integrally cured thereto, resulting in enhanced impact resistance and enhanced ability to withstand tensile load. The resultant structure has enhanced thermal insulation properties. The invention is further directed to a foam panel interface construction which renders the resultant structure impervious to wind damage at velocities in the range of about 155–310 mph.

6 Claims, 2 Drawing Sheets

HURRICANE RESISTANT FOAM-CONCRETE STRUCTURAL COMPOSITE

FIELD OF THE INVENTION

This invention relates to insulating foam building materials and methods for their use; particularly to buildings formed from structural composite members composed of rigid foam having a concrete formulation integrally affixed thereto that are hurricane resistant.

BACKGROUND OF THE INVENTION

Standard methods of construction generally require that a building, for example a single-family residential structure, be formed from a plurality of wooden or metal framing members, e.g. beams, joints and trusses; which are erected upon a solid foundation, and through which mechanically required components, e.g. pipes, electrical wiring, telephone cables and heat and air conditioning ducts and/or conduits are routed. After the mechanicals are contained within the framing members, the outer sheathing is attached thereto, forming the exterior wall and roof surfaces. Insulation is then fitted about the various interstices of the framed areas, and an interior wall surface, e.g. gypsum board, paneling, plywood sheathing, plaster or the like, is applied to form the interior walls and ceilings. Application of decorative and weather protective materials, e.g. brick, aluminum siding, shingles or the like is subsequently applied to the exterior surfaces, along with paint and moldings to complete the construction and render it aesthetically pleasing. Such methods of construction are time consuming and require the use of numerous crews of highly skilled tradesmen to complete each segment of the project. In order to render such construction more economical, and to allow a home to be completed in a shorter time frame, various alternative construction methods have been developed. For example, so-called modular homes have been constructed which use pre-fabricated sections, e.g. roof trusses, walls, and sometimes entire rooms, which sections are interconnected on-sight so as to form the finished structure. Such structures require numerous modifications in order to make them storm or hurricane resistant.

DESCRIPTION OF THE PRIOR ART

U.S. Pat. No. 5,771,649 describes a technique for forming a structure using foam blocks which are sprayed with a concrete formulation, which can include both a polymer and a fibrous material, and which is sprayed to form a concrete monocoque shell house.

U.S. Pat. No. 4,774,794 describes an energy efficient building system containing foam structural blocks having a reinforcing grid of fiberglass which is coated with a fiberglass reinforced cementitious acrylic polymer mixture. The mixture bonds to the fiberglass reinforcing grid, on the exterior and interior as necessary, to provide adequate strength. Junctions between blocks are held together by a continuous spline joint.

French Patent No. 767,681 illustrates building blocks which are stacked and secured via rods placed through judiciously spaced holes therethrough.

U.S. Pat. No. 3,292,331 describes an interlocking block wall construction wherein passages in stacked blocks are aligned so as to form a continuous vertical channel. The vertical channel allows for the positioning of reinforcing rods in said channels and cement composition about the rods.

U.S. Pat. No. 3,782,049 describes a plurality of wall forming blocks made from a foamed plastic material having various channels therethrough which are vertically aligned during assembly. A concrete slurry poured into these openings forms a concrete supporting grid within the wall.

U.S. Pat. No. 5,123,222 describes hollow foamed plastic forms for poured concrete.

U.S. Pat. No. 2,269,018 described glazed building blocks having spaces therein which may be filled with insulating material.

U.S. Pat. No. 5,566,521 discloses a concrete form mold unit constructed from a lightweight insulative material. Concrete and reinforcing rods fill rows of vertical core spaces thereby defining post structures. Surface finish materials are later joined to the attaching plates.

U.S. Pat. No. 5,231,813 describes insulated panels formed from a high density polymeric foam body defined by an interior wall spaced from an exterior wall wherein the exterior wall contains a cementitious layer coextensive therewith and wherein various interstices are filled with reinforcing rods and cement compositions.

U.S. Pat. No. 3,755,982 describes building panels wherein facing panels are sandwiched about a foam core. Vertical reinforcing rods are positioned to align the panels with the foundation and the injection of concrete formulations about the reinforcing rods strengthens and solidifies the structure.

U.S. Pat. No. 4,641,468 describes building panel structures and methods for erecting buildings utilizing structural foam combined with rigid framing members to provide a low cost modular building design.

All of these prior art attempts suffer from various shortcomings. The method of attachment of the variously disclosed panels require the use of differing types of hardware and the construction of passages or keyways in the panels. This creates a more complicated and costly structure, adds hardware requirements and concentrates any shearing forces at the particular points of attachment. Furthermore, the prior art also fails to disclose a composite concrete formulation which forms a self adherent concrete coating layer that is integrally bonded to the underlying foam upon curing. Lastly, none of the prior art methods describe a system whereby the roof assembly is formed contiguous with the sidewalls of the structure, resulting in a dwelling having a monolithic structure which is capable of resisting winds in the range of 155–310 mph without damage.

Thus, there exists a need in the construction industry for an economical building material and method for its use which results in easily assembled structures having enhanced thermal efficiency and increased resistance to wind damage.

SUMMARY OF THE INVENTION

The present invention is directed toward a new method of building construction which eliminates the traditional framed wall and trussed roof construction and provides a low cost housing construction that is storm and hurricane resistant. Rigid blocks of environmentally sensitive foamed styrene are utilized as the underlying structure of both the wall and roof members. Starting with a rigid base, e.g. a monolithic concrete slab, reinforced concrete slab, or the like, support panels of rigid foam are fastened thereto by using an adhesive material, such as a urethane, at the foam/concrete interface along the points of intersection. The foam is specially modified by creating channels suitable for accepting steel reinforcing rods spaced on four foot centers and about which is poured a concrete slurry having a composite strength of about 3000 psi. The channels act as a form for producing post, belt and suspender beams which are in turn tied to the foundation or slab, the exterior wall perimeter, the roof panels and peak. Upon setting, the concrete slurry/reinforcing rod combination thus creates a rigid skeletal structure about which the foam panels are anchored. In a similar manner, the panels which are to form the roof members, are arranged so that vertically extended sections of the wall section reinforcing rods are adjusted to be retained in the roof member reinforcing channels, and about which is poured a polymer-concrete slurry having a composite strength of about 6000 psi. Additionally, a centrally located reinforcing member constructed and arranged so as to support the expected roof loads, e.g. a specially configured steel reinforcing beam, such as a W-section, I-beam configuration, or equivalents, having perforations set upon four foot centers, accepts the reinforcing rods of the intersecting roof members.

Upon injection and solidification of the concrete reinforcing slurry throughout the passages created in the foam a specially formulated cementitious layer is applied to the interior and exterior faces of the styrene foam panels. The aqueous cement slurry includes an effective amount of ethylene vinyl acetate (EVAC). A plurality of fine polymer fibers is further added, and the mixture is blended until all ingredients are homogeneously dispersed. The resulting cement/EVAC/polymer fiber emulsion is then thinly applied to the foam panel surfaces in several coats until the desired thickness is obtained. Upon curing, the cementitious layer is uniquely bound to the styrene foam panels without the need for additional bonding agents.

While not wishing to be bound to any particular theory, it is submitted that the EVAC material cures by cross-linking, whereby polymer bonds are formed at available sights within the foamed styrene. The presence of the polymer fibers appear to further provide reaction sights within the cementitious layer which facilitates the formation of polymer bonding within that layer as well. Thus, the fully cured composite structure represents a foamed styrene having interior and exterior faces to which a cementitious layer is attached via a polymerization mechanism. The resulting material demonstrates greatly enhanced physical characteristics, for example, resistance to both wind and water damage, rigidity, protection from airborne debris, insulative properties of at least R-40, ease of modification such as the modification of existing openings or passages or the inclusion of new ones and increased flexural strength.

This method of construction reduces both the cost and time required for construction. The foam-concrete structural composite, possessing at least R-40 insulating characteristics, yields a structure which is extremely economical to heat or cool and one which is relatively impervious to damage due to weathering, termites, water and wind. The material is fire resistant, and is in compliance with ASTM standards for flame rating and smoke production.

Accordingly, it is an objective of the instant invention to teach a unique method of building construction utilizing a polymer bonded foam-concrete structural composite capable of withstanding hurricane force winds.

It is a further objective of the invention to teach a unique building material formed from a polystyrene foam having a cement/EVAC/polymer fiber emulsion integrally cured thereto, resulting in enhanced ability to withstand tensile load.

Yet another objective of the instant invention is to provide a building material having enhanced thermal insulation properties.

A still further objective of the instant invention is to teach a method for creating a reinforced steel/concrete skeletal framework in situ within the foam-concrete structural composite material.

An additional objective of the invention is to teach a foam panel interface construction which is capable of being made impervious to wind velocities in the range of about 155–310 mph.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Figure 1:
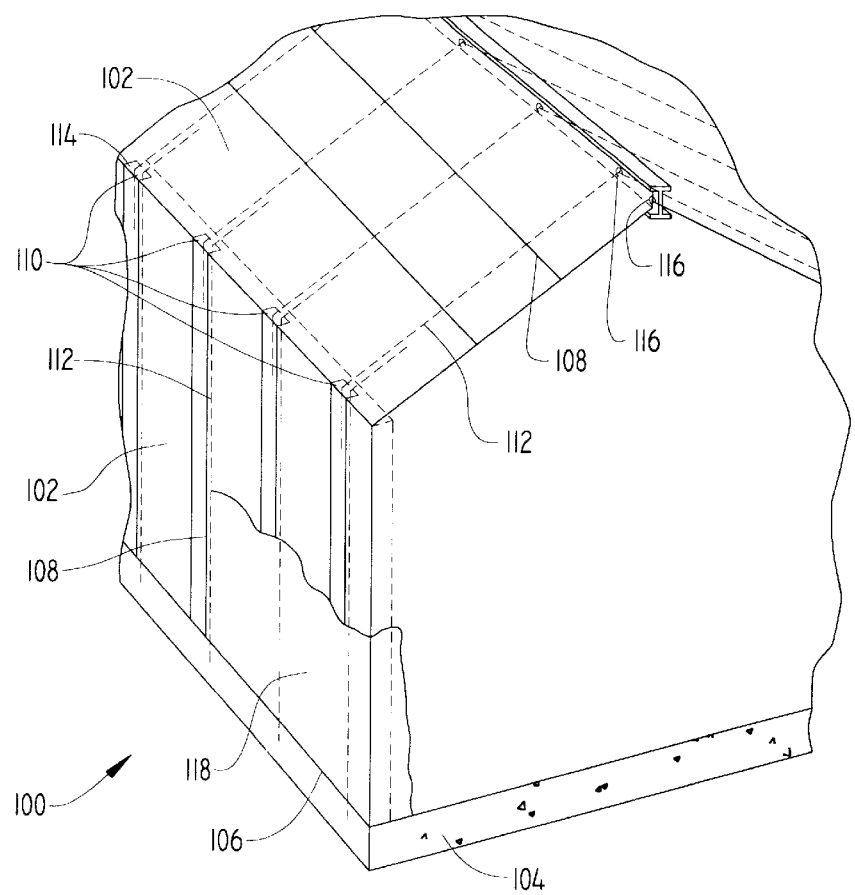
FIG. 1 is a cross-sectional view of a structure formed from polymer bonded foam-concrete structural composite materials in accordance with the instant invention.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

Figure 3:
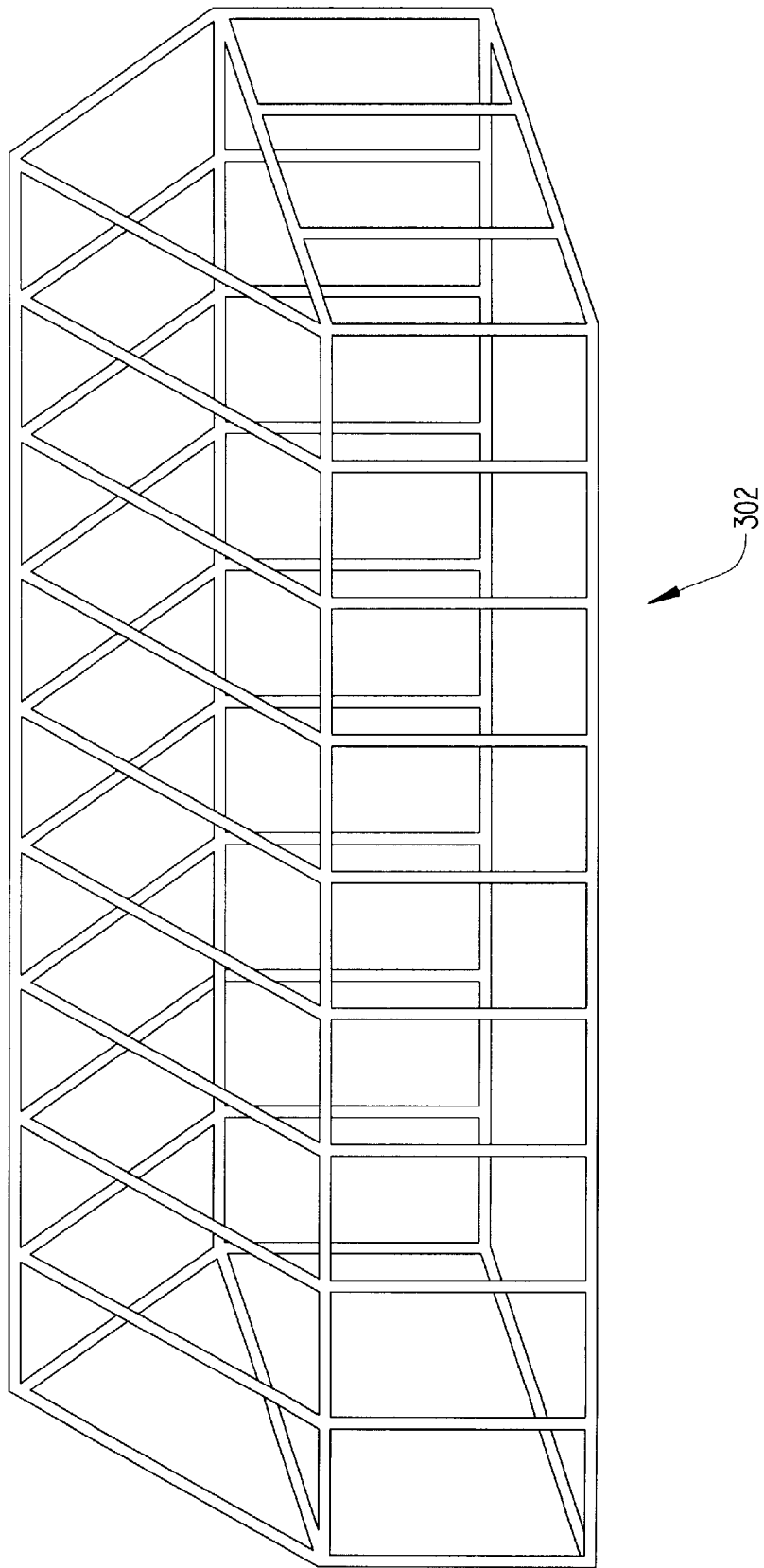
FIG. 3 is a perspective view of the concrete slurry/reinforcing rod combination rigid skeletal structure.

With reference to FIG. 1, a house structure 100 is formed from rigid panels of environmentally sensitive rigid styrene foam 102 which are utilized as the underlying structure of both the wall and roof members. In a preferred embodiment, the foam has a thickness of 8" and is supplied in panels of varying size, e.g. 4' wide about 24' in length. After forming a rigid base 104, including, but not limited to a monolithic concrete slab, reinforced concrete slab, foundation, or the like; the panels of rigid foam 102 are fastened thereto, e.g. by using an adhesive material, such as a urethane, at the foam/concrete interface 106 along the points of intersection. Multiple foam panels are similarly adhesively engaged to each other at joints 108 with a polyurethane adhesive or the like to form a rigid, adhesively engaged, sealed structure. The foam panels are specially modified by creating channels 110 into which are inserted steel reinforcing rods 112 which are spaced, for example on four foot centers and about which a concrete slurry 114 is poured to allow for the in situ formation of reinforced concrete formed post, belt and suspender beams which form a rigid skeletal structure or framework. Upon setting, the concrete slurry/reinforcing rod combination represents a rigid skeletal structure 302, which is best depicted in FIG. 3. The skeletal structure or framework 302 is tied to the slab or foundation and the foam panels 102 are anchored thereabout. The panels which are to form the roof portions or members are arranged so that vertically extended sections of the wall section reinforcing rods are adjusted so as to have an angle equal to the angle of the obliquely oriented roof portions, and are then inserted within the roof member reinforcing channels. Additionally, a centrally located roof reinforcing member, for example a steel I-beam, W-beam or equivalent reinforcing member, is constructed and arranged so as to support the expected roof loads and includes a plurality of particularly spaced perforations 116, e.g. at four foot centers, which accept the reinforcing rods of the intersecting roof members and fixedly engage them therein. Upon injection and solidification of the concrete reinforcing slurry throughout the passages created in the foam panels which form the roof and wall members, the reinforced skeletal framework is complete. A specially formulated fiber reinforced ethylene-vinyl acetate containing concrete layer 118 is then applied to the interior and exterior faces of the styrene foam panels. The cementitious layer contains a cementitious material, e.g. a commercial Portland cement based concrete formulation, to which is added an amount of polymer fibers effective to increase the ductility and tensile load bearing characteristics of the formulation, e.g. about 0.25"–0.50" polypropylene fibers, and an aqueous polymer emulsion. In a particularly preferred embodiment, vinyl acetate is reacted with gaseous ethylene until about a 3 wt. % ethylene concentration is achieved. Water is then added with constant agitation until an emulsion is formed containing about 55 wt. % of the ethylene-vinyl acetate reaction product. To this emulsion 2 wt. % propylene glycol and 1 wt. % ethylene-vinyl acetate copolymer is added to form a concentrate. The resultant concentrate is diluted in a ratio of about 3 parts concentrate to about 5 parts by weight of water to form a working solution. To this working solution, a commercial Portland formulation is admixed, followed by the inclusion of an amount of fine polymer fibers, e.g. polypropylene fibers or the like, having a length of about 0.25"–0.50", until all ingredients are homogeneously dispersed whereby a fiber reinforced ethylene-vinyl acetate containing concrete emulsion 118 is formed. The fibers are added in an amount effective to increase the tensile load characteristics of the stucco thereby imparting enhanced impact resistance and enabling it to withstand winds in excess of 155 mph. The novel cementitious material has alternative utilities such as an outer shell for standard construction, an outer coating for floating docks, etc.

In the instant invention, a cementitious layer is formed upon the foam panel surfaces by applying several thinly applied coats of the resulting fiber reinforced ethylene-vinyl acetate containing concrete emulsion 118 thereto until the desired thickness is obtained, e.g. about 0.5". Upon curing, the polymer constituent within the cementitious layer is uniquely bound to the styrene foam panels, thus creating an integrally bound structure without the need for additional bonding agents. While not wishing to be bound to any particular theory, the present inventor believes that the ethylene vinyl acetate in the emulsion cures by crosslinking, whereby polymer bonds are formed at available sights within the foamed styrene. The presence of the polymer fibers appear to further provide reaction sights within the cementitious layer which facilitates the formation of polymer bonding within that layer as well. Thus, the fully cured composite structure represents a foamed styrene having interior and exterior faces to which a cementitious layer is attached via a polymerization mechanism.

Figure 2:
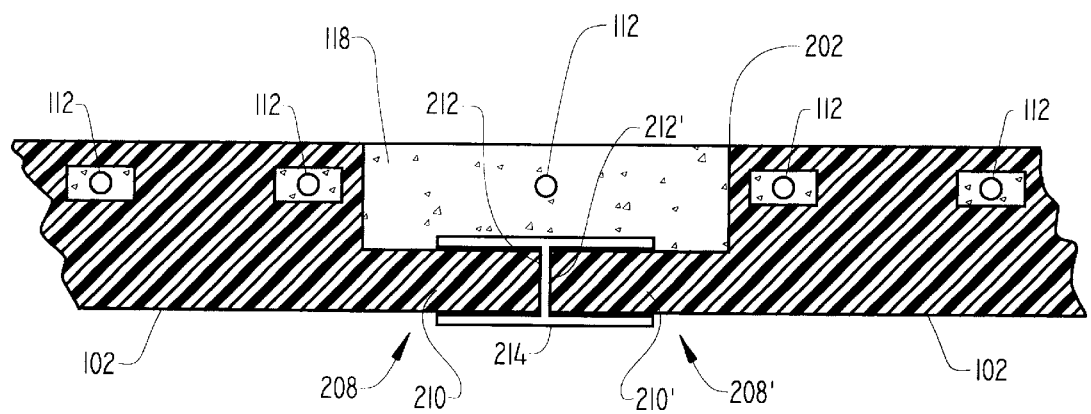
FIG. 2 is a cross sectional view of a preferred foam panel interface construction.

Now referring to FIG. 2, a preferred foam panel interface construction is shown wherein the foam panels 102 are joined in a manner designed to provide a structure having from about 155–310 mph wind resistance. The panels are first fabricated so that, when abutted, a channel 202 is formed along the top surface by cooperating recesses formed in each panel adjacent the extensions 210,210'. For example, 8"thick panels may be molded or otherwise fabricated to create projecting members 208,208', having an extension 210,210'and an abutting surface 212,212'. A bracket 214 formed from a suitably rigid material, e.g. sheet metal or the like, is dimensioned so as to accept the projecting members 208,208'therein in abutting relationship. The channel 202 is designed to accept a reinforcing rod 112 parallel to the abutment line defined between surfaces 212 and 212'. The reinforcing bar 112 (a plurality of bars may be used) spans the length of the panels 102 and engages the supporting structures adjacent thereto, e.g. the monolithic slab in the case of the wall sections, and the angled roof panels on the opposite side. The fiber reinforced, ethylene-vinyl acetate containing concrete emulsion 118 is then added within channel 202, filling the area and embedding the reinforcing bars therein. Upon curing, a unitary structure results having enhanced properties of rigidity and wind resistance, which, upon judicious placement of reinforcing rods, is capable of withstanding winds in excess of 155–310 mph.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. A method for manufacturing a wind resistant structure formed from a plurality of foam-concrete structural composite members comprising:

providing a rigid base having a shape defining an outer perimeter of said structure and being constructed and arranged to support said plurality of foam-concrete structural composite members;

affixing to said rigid base, a plurality of vertically oriented and adhesively engaged foam panels characterized as containing a plurality of channels adapted to contain a reinforcing post therein and whereby vertical wall portions of said structure are formed;

providing a plurality of obliquely oriented and adhesively engaged foam panels characterized as containing a plurality of channels adapted to contain a reinforcing post therein and whereby oblique roof portions of said structure are formed, said roof portions being adhesively attached to said vertical wall portions and further fixedly engaging a central horizontal reinforcing member, whereby a roof structure is formed;

inserting a plurality of reinforcing members within the channels of said vertical wall portions and said roof portions and further inserting a fiber reinforced, ethylene-vinyl acetate containing concrete emulsion within said channels whereby said reinforcing posts are formed in-situ;

applying multiple thin layers of said fiber reinforced, ethylene-vinyl acetate containing concrete emulsion to inner and outer surfaces of said vertical wall portions and roof portions, and curing said emulsion to provide an integrally bonded cementitious layer;

wherein a structure having enhanced tensile load characteristics is formed, said characteristics being effective to render said structure impervious to damage from winds in the range of about 155–310 mph.

2. The method of claim 1, wherein:

vertically extending sections of wall portion reinforcing members are adjusted to an angle which is equal to that of obliquely oriented roof portions and are inserted within reinforcing channels therein; and obliquely extending sections of reinforcing members protruding from an uppermost edge of the obliquely oriented roof portions are constructed and arranged to extend through specially configured perforations within said central horizontal roof reinforcing member;

whereby upon injection of a concrete reinforcing slurry within said reinforcing channels a reinforced skeletal framework having an integral, fixedly engaged centrally located roof reinforcing member is formed.

3. A fiber reinforced, ethylene-vinyl acetate containing concrete emulsion produced by:

1) forming an ethylene-vinyl acetate reaction product by contacting vinyl acetate with gaseous ethylene until about a 3 wt. % ethylene concentration is reached;

2) adding water with constant agitation until an emulsion is formed containing about 55 wt. % of said ethylene-vinyl acetate reaction product;

3) further including about 2 wt. % propylene glycol and 1 wt. % ethylene-vinyl acetate copolymer and continuing agitation whereby a stable concentrate is formed;

4) diluting the resultant stable concentrate of step (3) by adding about 3 parts by weight concentrate to about 5 parts by weight of water to form a working solution;

5) admixing the working solution of step (4) with a Portland mix, to form an ethylene-vinyl acetate containing concrete emulsion;

6) further admixing said ethylene-vinyl acetate containing concrete emulsion with an amount of fine polymer fibers effective to increase the tensile load characteristics of the ethylene-vinyl acetate containing concrete emulsion so as to enable it to withstand winds in excess of about 155 mph; and 7) agitating the mixture until a homogeneously dispersed, fiber reinforced ethylene-vinyl acetate containing concrete emulsion is formed.

4. The fiber reinforced, ethylene-vinyl acetate containing concrete emulsion of claim 3, wherein the fine polymer fibers are polypropylene fibers having a length of up to about 0.50".

5. In a house formed from rigid polystyrene foam panels having a concrete layer covering the inner and outer surfaces of the house structure, the improvement comprising:

the concrete layer being formed from a fiber reinforced, ethylene-vinyl acetate containing concrete emulsion produced according to the process of claim 3 and wherein said emulsion integrally bonds to the surface of the polystyrene panels upon solidification and curing thereof.

6. A house formed according to claim 5, further including a foam panel interface construction comprising:

first and second foam panels each being constructed and arranged to form a recess area and an abutting surface;

a bracket assembly for insertion of said first and second abutting surfaces, whereby upon insertion of said abutting surfaces within said bracket, said recess areas form a unitary post-forming channel adapted to receive a plurality of reinforcing bars and a quantity of said fiber reinforced, ethylene-vinyl acetate containing concrete emulsion therein;

whereby a unitary reinforced post structure is formed within said channel upon curing of said emulsion having enhanced rigidity and wind resistance effective to withstand winds in the range of about 155–310 mph.

* * * * *